(12) United States Patent
Silver et al.

(10) Patent No.: US 10,278,330 B2
(45) Date of Patent: May 7, 2019

(54) COMBINE FEEDER HOUSE GAUGE WHEELS

(71) Applicant: Deere & Company, Moline, IL (US)

(72) Inventors: Dennis P. Silver, Geneseo, IL (US); Jeffrey A. Nelson, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/290,398

(22) Filed: Oct. 11, 2016

(65) Prior Publication Data

US 2018/0098496 A1    Apr. 12, 2018

(51) Int. Cl.

| A01D 67/00 | (2006.01) |
|---|---|
| A01D 41/14 | (2006.01) |
| A01D 41/06 | (2006.01) |
| A01F 12/18 | (2006.01) |
| A01F 12/44 | (2006.01) |

(52) U.S. Cl.
CPC ............. *A01D 41/14* (2013.01); *A01D 41/06* (2013.01); *A01D 41/141* (2013.01); *A01D 41/144* (2013.01); *A01F 12/18* (2013.01); *A01F 12/44* (2013.01)

(58) Field of Classification Search
CPC .. A01D 41/141; A01D 41/145; A01D 75/002; A01D 41/16; A01D 75/287; A01D 34/008; A01D 67/00; A01D 41/06; A01D 41/148; A01B 73/00; A01B 73/005
See application file for complete search history.

(56) References Cited

U.S. PATENT DOCUMENTS

| 4,084,394 A | * | 4/1978 | van der Lely | ......... A01D 41/04 |
|---|---|---|---|---|
| | | | | 56/14.6 |
| 4,266,395 A | * | 5/1981 | Basham | ............... A01D 75/287 |
| | | | | 56/16.2 |
| 5,005,343 A | * | 4/1991 | Patterson | ............... A01D 41/14 |
| | | | | 56/14.4 |

(Continued)

FOREIGN PATENT DOCUMENTS

| DE | 102007033952 A1 * | 6/2008 | ........... A01B 73/065 |
|---|---|---|---|
| DE | 102011118510 | 5/2013 | |

(Continued)

OTHER PUBLICATIONS

Translation of the prior art cited: EP-1932416-A1 (Year: 2008).*
European Search Report for EP Application 17195961.2 dated Feb. 27, 2018.

*Primary Examiner* — Arpad Fabian-Kovacs
(74) *Attorney, Agent, or Firm* — Rathe Lindenbaum LLP; Stephen M. Patton

(57) ABSTRACT

A combine has a feeder house extending forward from the front of the combine, with the front of the feeder house defining a rectangular frame for supporting a harvesting head. A gauge wheel arrangement is supported on the rectangular frame and in turn supports the harvesting head. The gauge wheel arrangement includes a center frame that abuts the rectangular frame and pivots with respect to it. A left side frame with gauge wheels is hinged to the center frame. A right side frame with gauge wheels is hinged to the center frame. The center, left, and right frames can support the harvesting head and permit the harvesting head to pivot with respect to the feeder house, as well as supporting a part of the weight of the harvesting head on the gauge wheels.

20 Claims, 8 Drawing Sheets

(56) References Cited

U.S. PATENT DOCUMENTS

| | | | |
|---|---|---|---|
| 5,243,810 A * | 9/1993 | Fox | A01B 73/005 56/14.4 |
| 5,464,371 A * | 11/1995 | Honey | A01D 41/14 460/20 |
| 5,562,167 A * | 10/1996 | Honey | A01B 73/00 16/18 R |
| 6,282,875 B1 * | 9/2001 | Holtkotte | A01B 73/00 56/228 |
| 6,789,379 B2 | 9/2004 | Heidjann et al. | |
| 6,843,046 B2 * | 1/2005 | Heidjann | A01D 67/00 56/208 |
| 7,222,475 B2 * | 5/2007 | Bomleny | A01D 41/141 56/10.2 E |
| 7,234,291 B2 * | 6/2007 | Rickert | A01D 41/142 56/12.6 |
| 7,404,283 B2 * | 7/2008 | Viaud | A01D 41/148 56/15.5 |
| 7,430,846 B2 * | 10/2008 | Bomleny | A01D 41/141 56/10.2 E |
| 7,552,578 B2 * | 6/2009 | Guske | A01B 71/063 56/14.9 |
| 7,658,233 B1 * | 2/2010 | Aho | A01B 43/00 171/63 |
| 7,661,251 B1 * | 2/2010 | Sloan | A01D 41/141 56/10.2 E |
| 7,908,838 B2 * | 3/2011 | Hohlfeld | A01D 43/081 56/228 |
| 7,926,249 B1 * | 4/2011 | Cook | A01B 73/005 172/240 |
| 7,971,420 B1 * | 7/2011 | Bollin | A01D 41/145 56/208 |
| 8,087,224 B1 | 1/2012 | Coers et al. | |
| 8,245,489 B2 * | 8/2012 | Talbot | A01D 41/141 56/10.2 E |
| 8,631,634 B2 * | 1/2014 | Vereecke | A01D 41/16 56/14.9 |
| 9,125,343 B2 | 9/2015 | Duquesne et al. | |
| 9,148,998 B2 * | 10/2015 | Bollin | A01D 41/141 |
| 9,717,181 B2 * | 8/2017 | Boyd, III | A01D 41/16 |
| 9,775,291 B2 * | 10/2017 | Neudorf | A01D 41/145 |
| 9,844,184 B2 * | 12/2017 | Johnson | A01D 75/287 |
| 2004/0011538 A1 * | 1/2004 | Raducha | A01B 59/042 172/311 |
| 2005/0028509 A1 * | 2/2005 | Viaud | A01D 41/148 56/341 |
| 2010/0043368 A1 * | 2/2010 | Sloan | A01D 41/141 56/10.2 E |
| 2010/0281837 A1 * | 11/2010 | Talbot | A01D 41/141 56/10.2 E |
| 2014/0041351 A1 * | 2/2014 | Bollin | A01D 41/127 56/10.2 E |
| 2015/0027097 A1 | 1/2015 | Shrattenecker | |
| 2015/0033692 A1 * | 2/2015 | Schroeder | A01D 34/008 56/10.2 E |
| 2015/0271999 A1 * | 10/2015 | Enns | G05B 15/02 700/275 |
| 2016/0183461 A1 * | 6/2016 | Neudorf | A01D 41/14 56/158 |
| 2016/0278276 A1 * | 9/2016 | De Coninck | A01B 63/004 |
| 2017/0013778 A1 * | 1/2017 | Borry | A01D 41/145 |
| 2018/0035598 A1 * | 2/2018 | Wenger | A01B 73/065 |

FOREIGN PATENT DOCUMENTS

| | | | | |
|---|---|---|---|---|
| EP | 1576870 A1 * | 9/2005 | | A01D 41/127 |
| EP | 1932416 A1 * | 6/2008 | | A01B 73/065 |
| EP | 2832206 | 2/2015 | | |

* cited by examiner

COMBINE FEEDER HOUSE GAUGE WHEELS

FIELD OF THE INVENTION

This invention relates to agricultural combines. More particularly, it relates to gauge wheels for supporting crop harvesting heads.

BACKGROUND OF THE INVENTION

Agricultural combines gather crop plants from the ground, separate the actual crop from the residue, and then distribute the residue over the ground behind the combine. It is desirable to spread residue evenly over the ground behind the combine, covering the ground that has just been harvested.

Agricultural harvesting heads are supported on the front of the agricultural combines to sever the crop from the ground and feed the severed crop plants into the combine itself. The harvesting heads are typically supported on a conveyor housing that extends forward from the agricultural combine. This conveyor housing is typically called a "feeder house". It is pivotally connected to the combine and can be raised and lowered with respect to the combine.

Agricultural harvesting heads mounted on combines are getting larger, wider, and heavier. To reduce the weight on the front of the combine, several means have been proposed to add wheels.

U.S. Pat. No. 9,125,343 discloses a pivoting framework with a single support wheel that is mounted to the underside of the combine feeder house.

U.S. Pat. No. 6,789,379 discloses two arms pivotally coupled to a front axle the combine and extending forward underneath the feeder house. Wheels are mounted on the forward ends of these arms.

Neither these two arrangements distribute the harvesting head load very well on their wheels.

It is an object of this invention to provide a gauge wheel arrangement that more evenly distributes the load of the agricultural harvesting head.

SUMMARY OF THE INVENTION

In accordance with a first aspect of the invention, an agricultural combine includes: a chassis; wheels supporting the chassis for travel over the ground; a separating system configured to separate grain from material other than grain; a cleaning system configured to clean grain exiting the separating system; a feeder house supported on the front of the chassis and extending forwardly, the feeder house further comprising a first frame that is generally rectangular, and vertically and transversely extending, and having a first opening in the first frame that is generally rectangular, and vertically and transversely extending, wherein the first opening is configured and disposed to receive and transmit all cut crop material received from a harvesting head, wherein the harvesting head is supported on the front of the feeder house; a gauge wheel arrangement comprising: a second frame that is supported on the first frame, and further wherein the second frame has a second opening that is generally rectangular and vertically extending, and further wherein the first frame is supported on the second frame, and is aligned with the second frame, such that substantially all cut crop material passing from the harvesting head passes through the second frame and second opening and then through the first frame and the first opening, And further wherein the second frame can pivot with respect to the first frame; a third frame that is generally rectangular and vertically extending, wherein a vertical side member of the third frame is hinged to a vertical side member of the second frame to define a generally vertical pivot axis, and further wherein the third frame comprises at least one gauge wheel that is supported for rotation on the third frame; and a fourth frame that is generally rectangular and vertically extending, wherein a vertical side member of the fourth frame is hinged to a vertical side member of the second frame, to define a generally vertical pivot axis and further wherein the fourth frame comprises at least one gauge wheel that is supported for rotation on the fourth frame.

The agricultural combine may further comprise a first arm having an outer end coupled to a lower, outer portion of the third frame to pivot up and down at its outer end with respect to the third frame, and on which outer end of said first arm the at least one gauge wheel is supported to pivot up and down, and to rotate with respect to said first arm.

The agricultural combine may further comprise a second arm having an outer end coupled to a lower, outer portion of the fourth frame, to pivot up and down at its outer end with respect to the fourth frame and on which outer end of said second arm the at least one gauge wheel is supported to pivot up and down, and to rotate with respect to said second arm.

The second frame, the third frame, and the fourth frame, may be parallel to each other in an operational position.

The second frame may include an upper surface that faces up and that is configured to support an upper beam of the harvesting head.

The third frame and the fourth frame may include an upper surface that faces up and that is configured to support an upper beam of the harvesting head.

The second frame may include a wall that extends upward from the upper surface and is disposed to abut the upper beam.

In accordance with a second aspect of the invention, a gauge wheel arrangement for an agricultural combine is provided, wherein the agricultural combine has a chassis; a cleaning and separating system, a feeder house extending forward from the front of combine and configured to convey cut crop material to the cleaning and separating system, and further wherein the feeder house has a first frame that is generally rectangular and extends vertically and transversely, wherein the first frame defines an opening for receiving cut crop material from a harvesting head and for conveying it to the cleaning and separating system, and further wherein the first frame is configured to support a harvesting head on the front of the feeder house, the gauge wheel arrangement including: a second frame that is configured to be pivotally supported on the first frame, wherein the second frame has a second opening that is generally rectangular and vertically extending, and further wherein the first frame is supported on the second frame, and is aligned with the second frame, such that substantially all cut crop material passing from the harvesting head passes through the second frame and second opening and then through the first frame and the first opening, And further wherein the second frame can pivot with respect to the first frame; a third frame that is generally rectangular and vertically extending, wherein a vertical side member of the third frame is hinged to a vertical side member of the second frame to define a generally vertical pivot axis, and further wherein the third frame comprises at least one gauge wheel that is supported for rotation on the third frame; and a fourth frame that is generally rectangular and vertically extending, wherein a vertical side member of the fourth frame is hinged to a vertical side member of the second frame, to define a generally vertical pivot axis and further wherein the fourth frame comprises at least one gauge wheel that is supported for rotation on the fourth frame.

The gauge wheel arrangement may further comprise a first arm having an outer end coupled to a lower, outer portion of the third frame to pivot up and down at its outer end with respect to the third frame, and on which outer end of said first arm the at least one gauge wheel is supported to pivot up and down, and to rotate with respect to said first arm.

The gauge wheel arrangement may further comprise a second arm having an outer end coupled to a lower, outer portion of the fourth frame, to pivot up and down at its outer end with respect to the fourth frame and on which outer end of said second arm the at least one gauge wheel is supported to pivot up and down, and to rotate with respect to said second arm.

The second frame, the third frame, and the fourth frame, may be parallel to each other in an operational position.

The second frame may include an upper surface that faces up and that is configured to support an upper beam of the harvesting head.

The third frame and the fourth frame may include an upper surface that faces up and that is configured to support an upper beam of the harvesting head.

The second frame may include a wall that extends upward from the upper surface and is disposed to abut the upper beam.

DETAILED DESCRIPTION OF THE PREFERRED EMBODIMENTS

Figure 1:
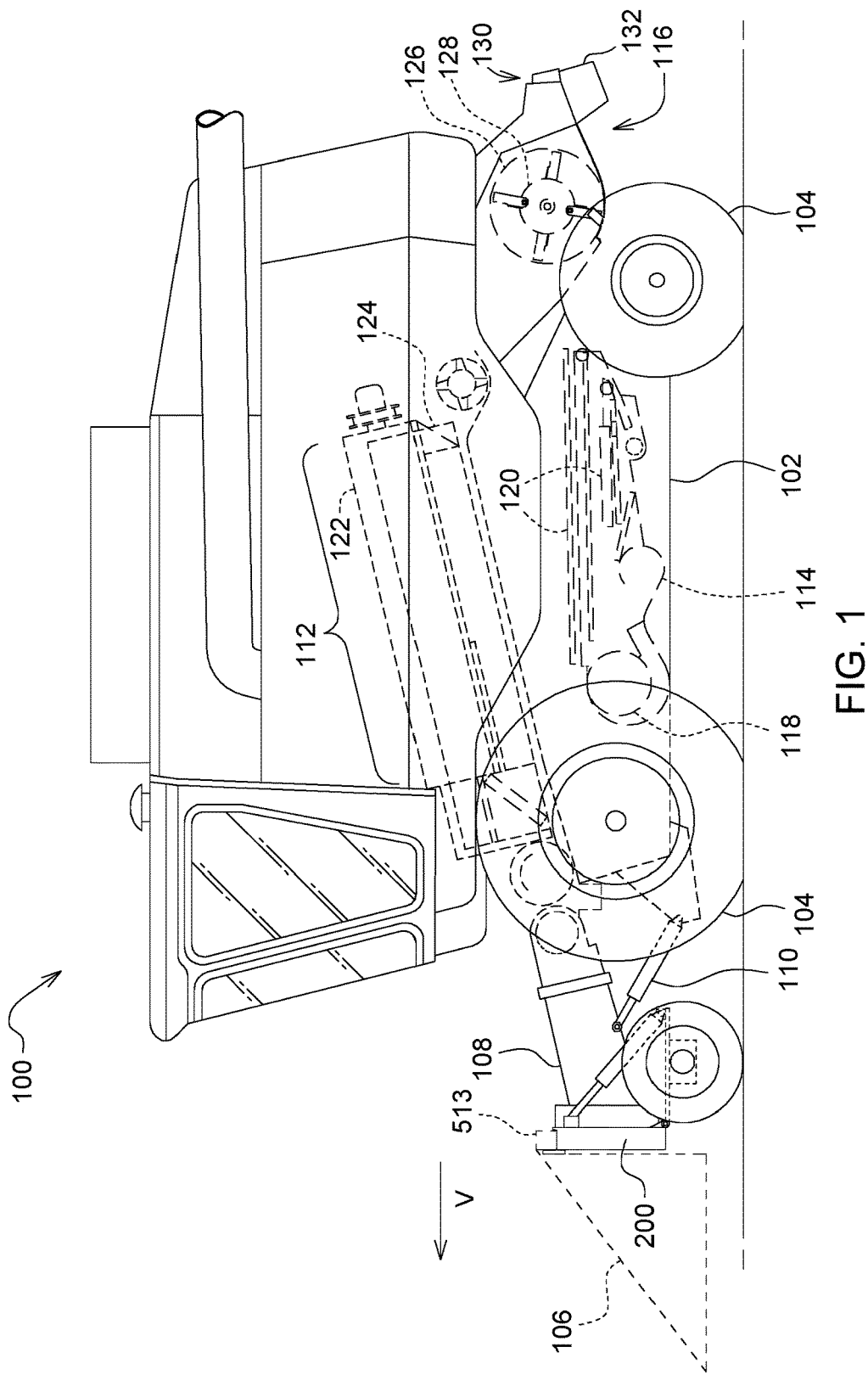
FIG. 1 is a side view of an agricultural combine having a gauge wheel arrangement in accordance with the present invention.

Referring to FIG. 1, an agricultural combine 100 is configured to travel through an agricultural field harvesting crops. The combine 100 comprises a chassis 102 supported on wheels 104. A harvesting head 106 is supported on a feeder house 108 that is supported on the chassis 102. A gauge wheel arrangement 109 is disposed between the feeder house 108 and the harvesting head 106 to support some of the weight of the harvesting head. The feeder house 108 (and hence the harvesting head 106) can be raised and lowered by actuators 110 that are coupled to and between the feeder house 108 and the chassis 102. The chassis 102 supports a threshing and separating system 112. The threshing and separating system 112 is disposed behind the feeder house 108. The combine 100 also comprises a cleaning system 114 disposed below the threshing and separating system 112. A residue distribution system 116 is disposed behind the threshing and separating system 112 and the cleaning system 114.

As the agricultural combine 100 is driven through the field, the harvesting head 106 severs crop plants adjacent to the ground and conveys them to the feeder house 108. The feeder house 108 has an internal conveyor (not shown) of conventional arrangement that carries the cut crop material upward and into an inlet of the threshing and separating system 112.

The threshing and separating system 112 threshes and separates the cut crop material into flows of crop residue and crop (i.e. grain). The grain falls into the cleaning system 114 where it is cleaned using a flow of air that is directed upward through the grain falling into the cleaning system 114. A fan 118 generates the flow of air. Sieves 120 direct the flow of air through the grain falling into the cleaning system 114. Light crop residue (i.e. husks, fines, dust, etc.) is carried rearward in the flow of air and is deposited on the ground.

The threshing and separating system 112 comprises an elongate, cylindrical threshing rotor 122 that is disposed in a concave 124. The concave 124 is formed as a half cylindrical shell having an evenly perforated surface. These perforations permit the concave to function as a grating or screen through which grain can pass but most of the residue does not. The grain falls through the perforations in the concave and downward into the cleaning system 114. The bulk of the crop residue is conveyed rearward between the rotor 122 and the concave 124 until it is released at the rear of the rotor and concave. The crop residue then falls downward into a chopper 126 that chops the residue between a row of stationary knives and rotating knives extending from a chopper cylinder 128.

This chopping process accelerates the crop residue and throws it backward into a residue spreader 130. The residue spreader 130 includes crop deflectors 132.

Figure 2:
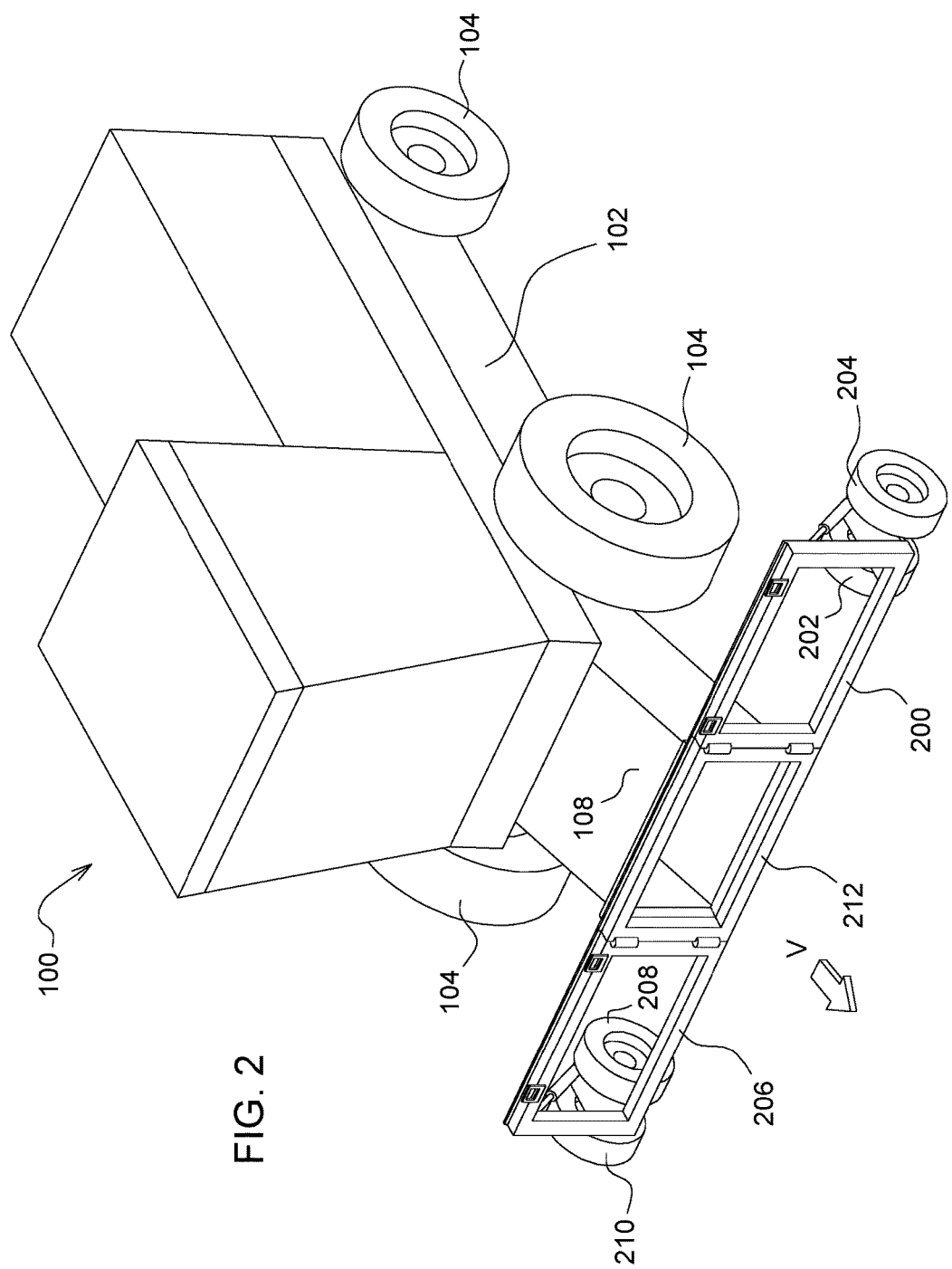
FIG. 2 is a perspective front view of the agricultural combine of FIG. 1.
Figure 3:
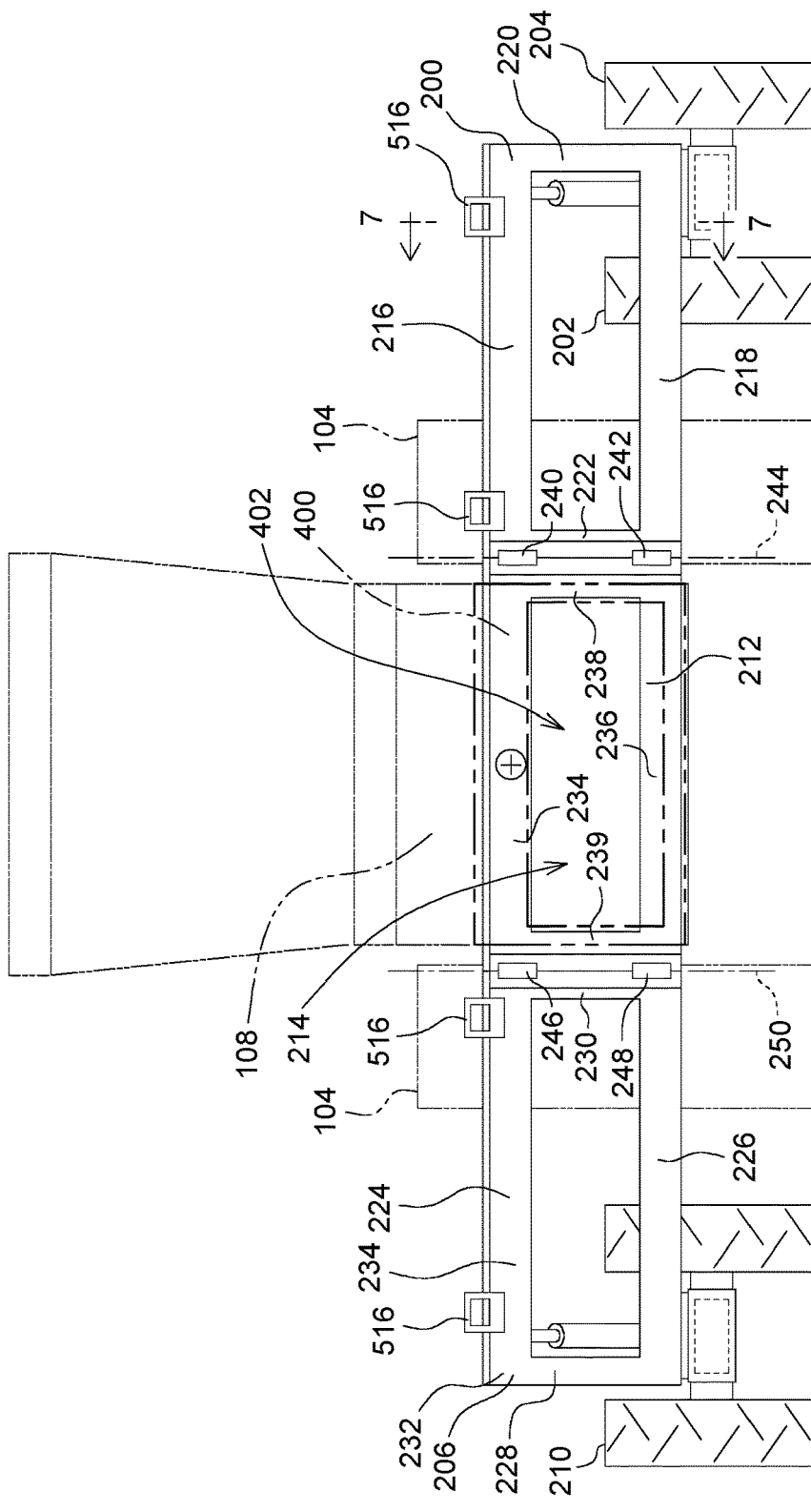
FIG. 3 is a front view of the gauge wheel arrangement.

Referring to FIGS. 2 and 3, the gauge wheel arrangement 109 comprises a left side frame 200 that is pivotally coupled to and supported by an inner gauge wheel 202 and an outer gauge wheel 204.

The gauge wheel arrangement 109 also comprises a right side frame 206 that is pivotally coupled to and supported by an inner gauge wheel 208 and an outer gauge wheel 210. The right side frame and gauge wheels are mirror images of the left side frame and gauge wheels.

The gauge wheel arrangement 109 also comprises a center frame 212 that is generally rectangular and has a center aperture 214 passing through a center region of the center frame 212. The center aperture 214 receives cut crop matter. The cut crop matter passes from the harvesting head, through the center aperture 214, and is received into the feeder house 108. The internal conveyor in the feeder house carries the crop upward and deposits it in the combine itself.

The left side frame 200 comprises a generally horizontal elongate top member 216, a generally horizontal elongate bottom member 218 that is parallel to the top member 216, a generally vertical side member 220, and generally vertical side member 222 that is parallel to the side member 220. The four members 216, 218, 220, and 222 are joined at their ends to define a generally rectangular frame 224.

The right side frame 206 comprises a generally horizontal elongate top member 224, a generally horizontal elongate bottom member 226 that is parallel to the top member 224, a generally vertical side member 228, and generally vertical side member 230. The four members 224, 226, 228, and 230, are joined at their ends to define a generally rectangular frame 232.

The center frame 212 comprises a generally horizontal elongate top member 234, a generally elongate bottom member 236, that is parallel to the top member 234, and generally vertical side member 238 and a generally vertical side member 239 that is parallel to the side member 238.

Two hinges 240, 242 (an upper and a lower hinge) are fixed between the left side frame 200 and the center frame 212. The hinges 240, 242 are fixed between the vertical side member 222 and the vertical side member 238. The hinges 240, 242 define a vertical hinge axis 244 that permits the left side frame 200 to pivot with respect to the center frame 212 about axis 244.

Two hinges 246, 248 (an upper and a lower hinge) are fixed between the right side frame 206 and the center frame 212. The hinges 246, 248 are fixed between the side member 230 and the side member 239. The hinges 246, 248 define a vertical hinge axis 250 that permits the right side frame 206 to pivot with respect to the center frame 212 about axis 250.

Figure 4:
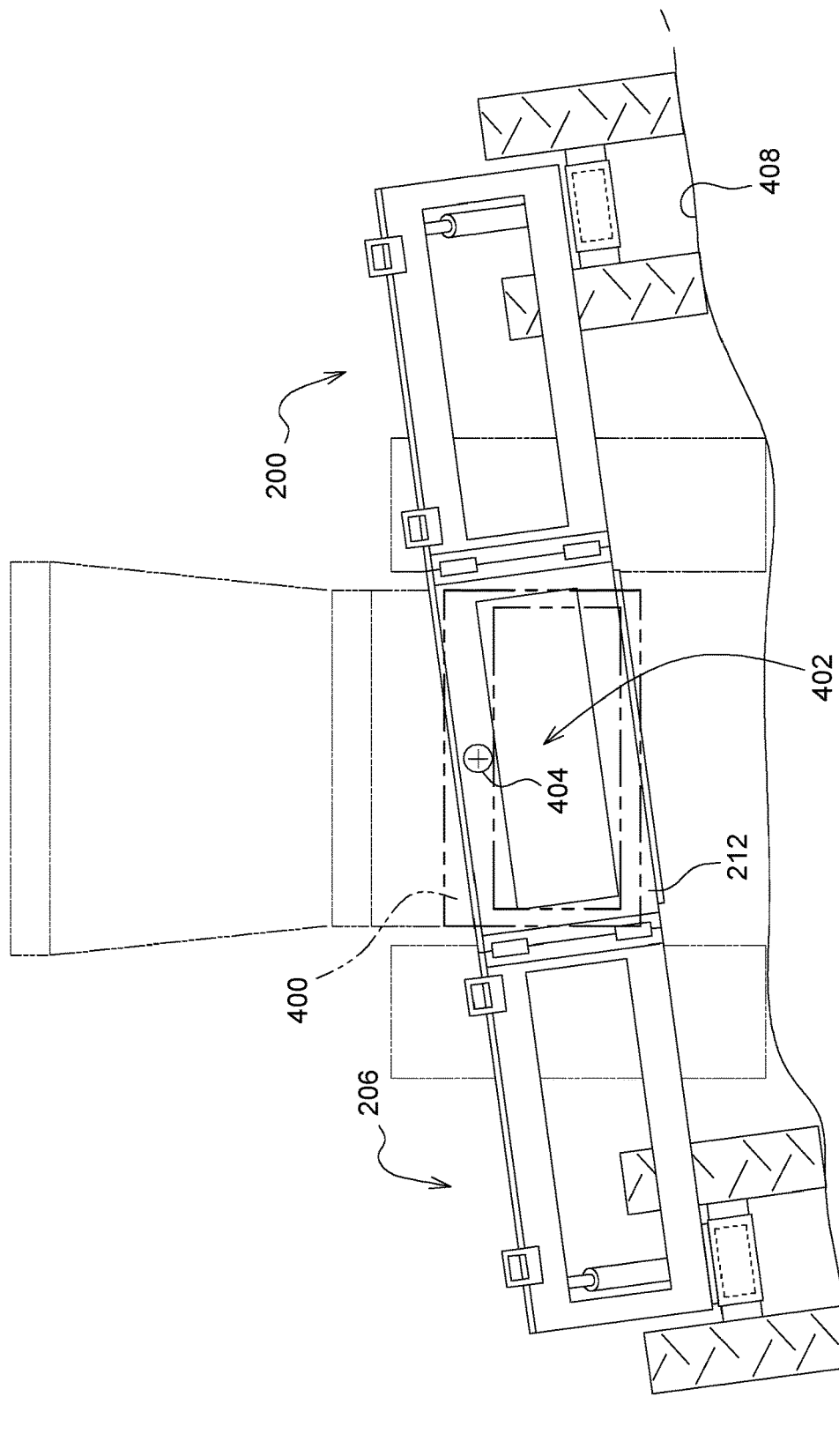
FIG. 4 is a front view of the gauge wheel arrangement of FIG. 3 with the gauge wheels and pivoting support frame in a pivoted position.

Referring to FIGS. 3 and 4, the center frame 212 is generally planar and extends in a lateral and vertical direction. The center frame 212 is supported on a feeder house frame 400 that is generally the same size as the center frame and is similarly constructed out of four members that form a rectangle and define a feeder house inlet 402 there through of substantially the same size as the center aperture 214 of the center frame 212.

Center frame 212 is not fixed to the feeder house frame 400, but is supported on the feeder house frame 400 by a pivot 404, which couples the center frame 212 and the feeder house frame 400. The pivot 404 permits the feeder house frame 400 to pivot about a pivot axis 406 defined by the pivot 404.

As the combine travels over irregular ground, such as an agricultural field, the gauge wheels on the left side frame 200 and the right side frame 206 can be lifted up and lowered with respect to each other. By supporting the center frame 212 on the feeder house frame 400 with the pivot 404, the center frame 212 can pivot back and forth with respect to the feeder house frame 400. This relative motion permits the gauge wheels to move up and down independently of each other, without twisting and possibly damaging the feeder house 108.

FIG. 4 illustrates the relative motion of the gauge wheel arrangement 109 with respect to the feeder house frame 400 as the gauge wheels of the left side frame roll over a mound of soil 408. The amount of relative rotation shown in FIG. 4 is greatly exaggerated in order to better illustrate the operation. When the gauge wheels on the left side of the gauge wheel arrangement 109 rise up over the ground, they apply an upward force to the left side frame 200 of the gauge wheel arrangement 109. The left side frame 200 applies an upward moment to the center frame 212 through the two hinges 240, 242. This in turn causes the center frame 212 to rotate (counterclockwise in FIG. 4) about the pivot 404 with respect to the feeder house frame 400.

Thus, the counterclockwise moment applied to the gauge wheels of the left side frame 200 does not twist and damage the feeder house frame 400.

Figure 5:
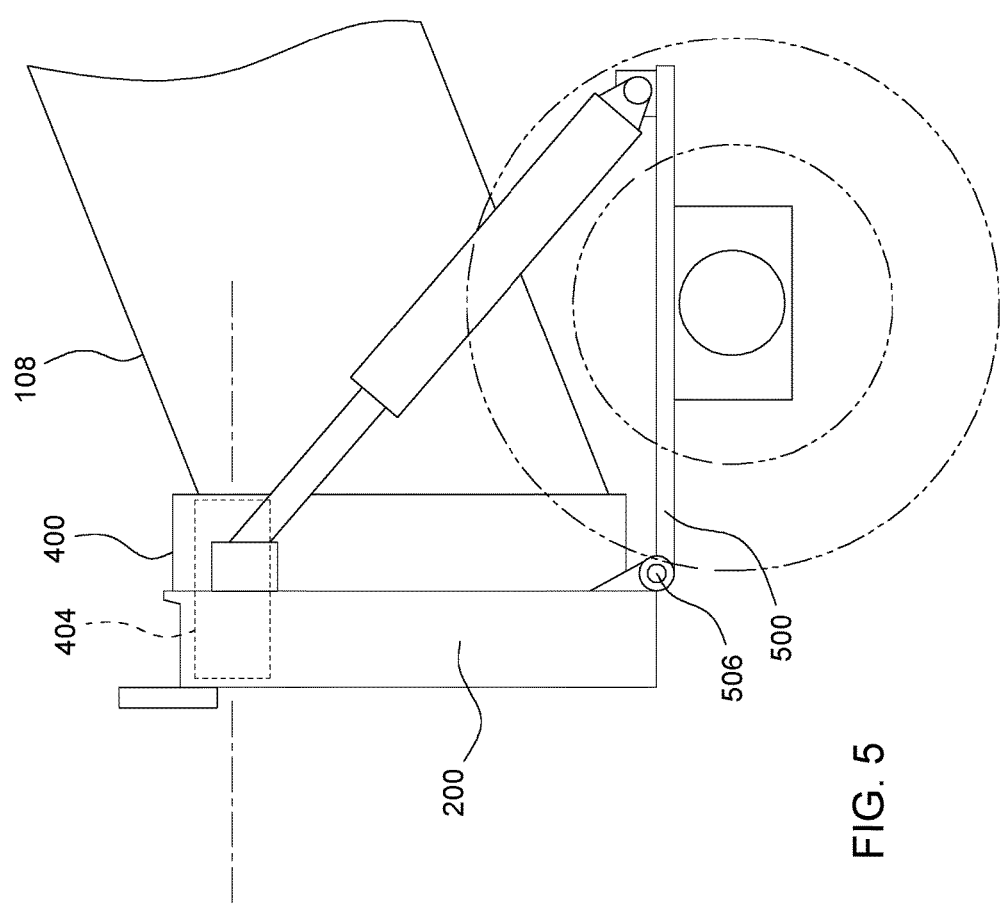
FIG. 5 is a side view of the left side gauge wheels.
Figure 6:
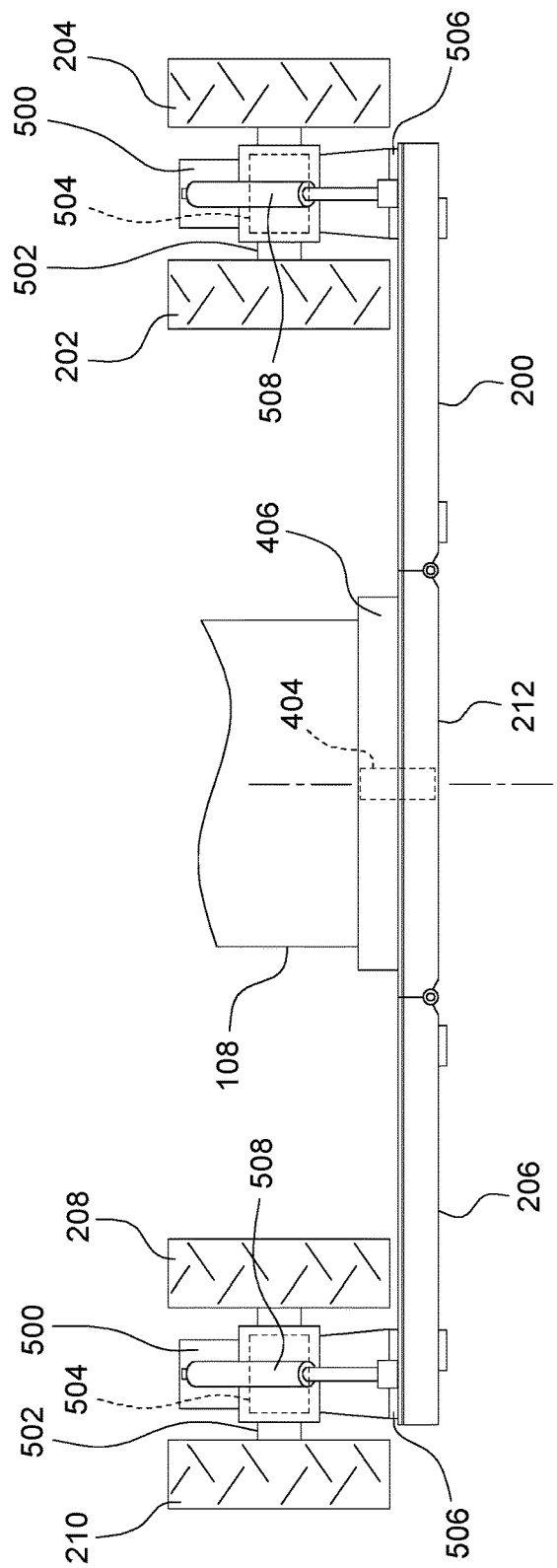
FIG. 6 is a plan view of the left side gauge wheels.

FIGS. 5 and 6 illustrate the feeder house 108, the left side frame 200 and the right side frame 206. The right side frame 212 is identically constructed, but in mirror image form. In FIG. 5, an arm 500 is pivotally connected to the left side frame 200 and extends rearward from (i.e. it trails) the left side frame 200. The arm 500 extends rearward downward from the left side frame 200. At its lower, rearward end, the arm 500 supports the inner gauge wheel 202 and the outer gauge wheel 204. A pivot 506 couples the arm 500 to the left side frame 200. The pivot 506 permits the arm 500 to pivot up and down at its outer end with respect to the left side frame 200.

Gauge wheels 202, 204 are supported on opposing ends of an axle 502 that in turn is supported on the distal end of the arm 500 for rotation with respect to the arm. In one arrangement, axle 502 and gauge wheels 202, 204 rotate freely with respect to the arm 500. In an alternative arrangement, a motor 504 (e.g. an electric motor or hydraulic motor) is coupled to the axle 502 and drives the gauge wheels 202, 204 in rotation.

Thus, the gauge wheel arrangement 109 not only supports the feeder house 108 and the harvesting head 106, but it assists the wheels 104 of the combine 100 to drive the combine+feeder house+harvesting head over the ground. This also reduces the strain on the feeder house 108. Without the driven wheels, it is the feeder house 108 alone that pushes the harvesting head 106 over the ground.

An actuator 508, such as an extendable and retractable linear actuator, or hydraulic cylinder is coupled between the side frame 200 and an outer portion 510 of the arm 500. The actuator 508 extends and retracts when the arm 500 pivots up and down at its outer end about pivot 506.

The actuator 508 can be configured to function as a spring, by connecting the cylinder to a gas charged accumulator.

The actuator 508 can be configured to function as a rigid member (and thus prevent pivoting arm 500) by blocking one or both cylinder ports of the actuator 506.

In an alternative arrangement, the actuator 506 can be a spring, such as a coil spring or leaf spring that is coupled between the arm 500 and the left side frame 200 and positioned to flex whenever the arm 500 pivots up and down with respect to the left side frame 200.

The right side frame 206 has the same arm, actuator and gauge wheel arrangement as the left side frame 200, but in mirror image form.

Figure 7:
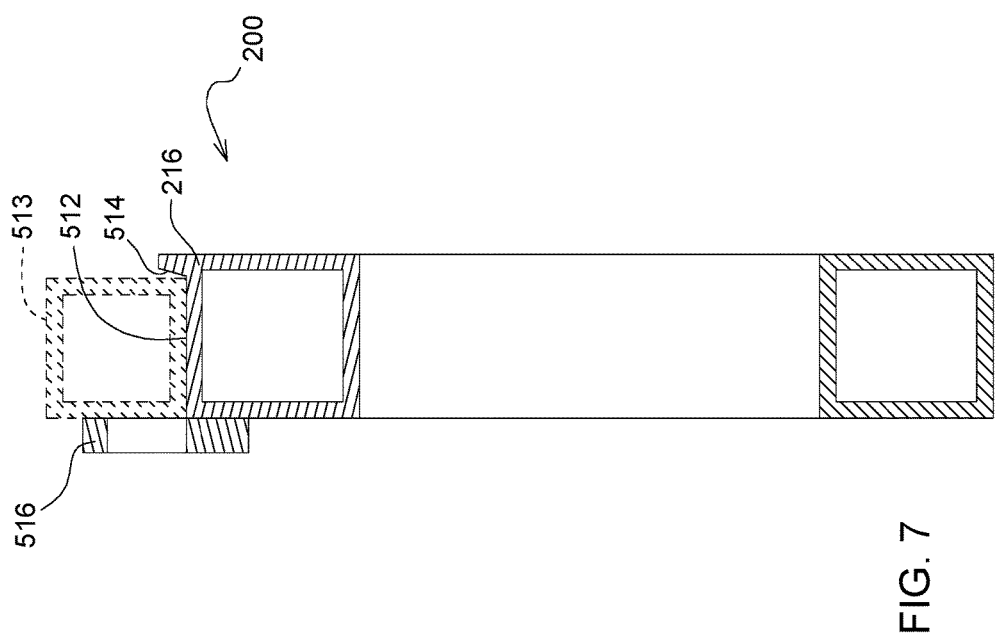
FIG. 7 is a cross-section through the upper frame member of the left side gauge wheels taken at section line 7-7 in FIG. 3.

FIG. 7 illustrates a cross-section through the left side frame 200. The horizontal elongate top member 216 is a generally rectangular beam having an upper surface 512 that faces upward and extends the length of the top member 216. The upper surface 512 supports a laterally extending top beam 513 of the agricultural harvesting head. Top member 216 also has a rear wall 514 that extends upward from the trailing edge of the upper surface 512. Top member 216 also has a plurality of retainers 516, here shown as hooks that extend upwards from the leading edge of the upper surface 512. The upper surface 512, the rear wall 514 and the retainers 516 support the harvesting head 106 and keep it from falling off the gauge wheel arrangement 109. Although FIG. 7 illustrates a cross-section of side frame 200, the other side frame, and the center frame are constructed identically with the same upper surface 512, rear wall 514, and retainers 516, and the top beam 513 of the agricultural harvesting head extends across all three frames and is supported by all three frames in the same manner.

Figure 8:
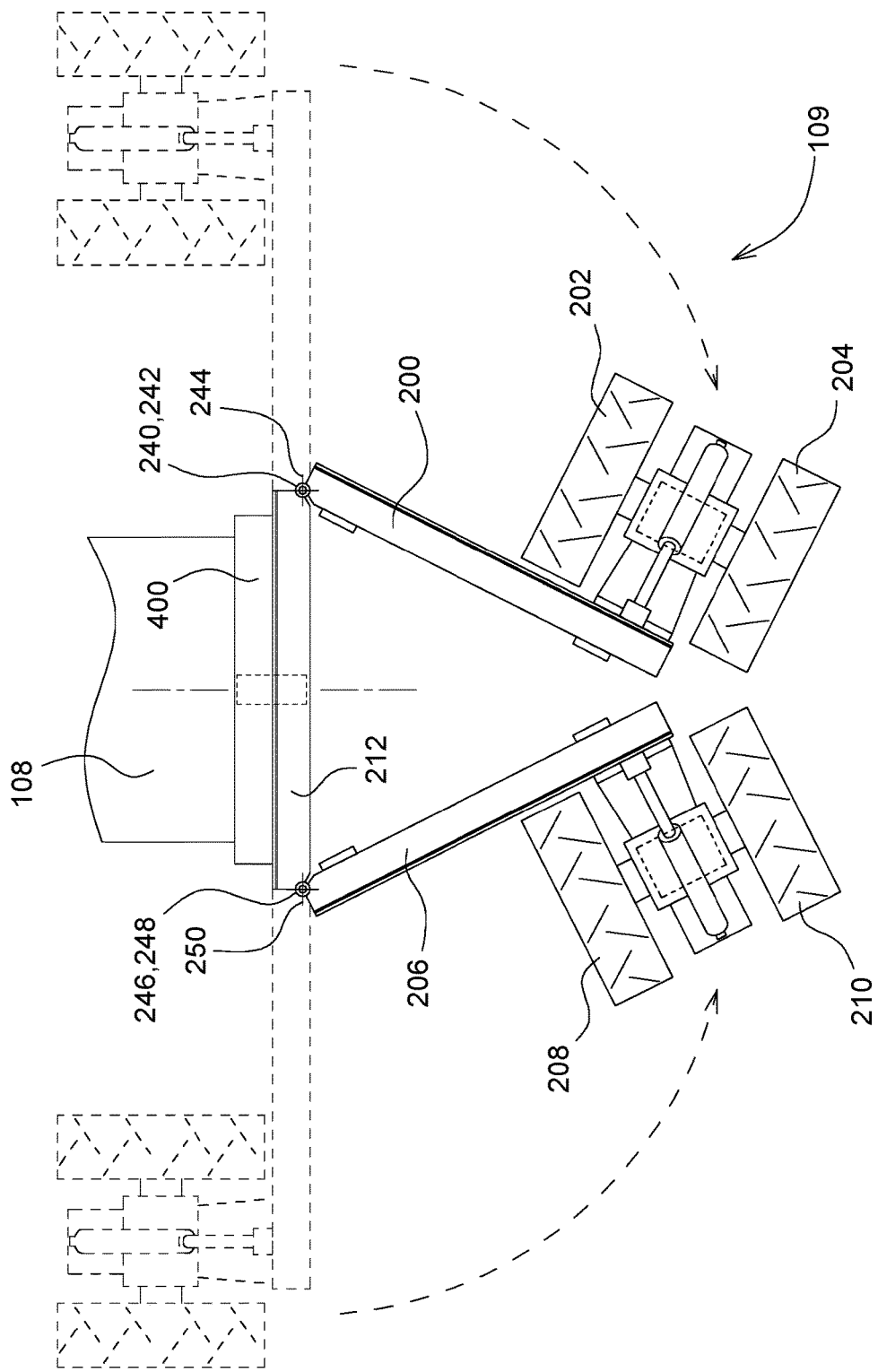
FIG. 8 is a plan view of the left side gauge wheels in pivoted positions.

FIG. 8 illustrates the adjustability of the gauge wheel arrangement 109. The left side frame section 200 can be pivoted forwardly with respect to the center frame section 212 about hinges 240, 242 and axis 244. The right side frame section 206 can be pivoted forwardly with respect to the center frame section 212 about hinges 246, 248 and axis 250. In this pivoted position, the overall lateral width of the gauge wheel arrangement 109 is reduced, permitting the agricultural combine 100 to navigate around obstacles and on the road with less interference.

The claims define the invention, not the description and the associated figures. The description and figures are provided as a convenience to the reader to illustrate and explain a few of the ways of making and using the invention. There are other ways of making and using the invention that would be apparent to those skilled in the art of agricultural combine design.

The invention claimed is:
1. An agricultural combine comprising:
a chassis;
wheels supporting the chassis for travel over the ground;
a separating system configured to separate grain from material other than grain;
a cleaning system configured to clean grain exiting the separating system;
a feeder house supported on the front of the chassis and extending forwardly, the feeder house further comprising a first frame that is generally rectangular, and vertically and transversely extending, and having a first opening in the first frame that is generally rectangular, and vertically and transversely extending, wherein the first opening is configured and disposed to receive and transmit all cut crop material received from a harvesting head, wherein the harvesting head is supported on the front of the feeder house;
a gauge wheel arrangement comprising:
a second frame that is supported on the first frame, and further wherein the second frame has a second opening that is generally rectangular and vertically extending, and further wherein the first frame is supported on the second frame, and is aligned with the second frame, such that substantially all cut crop material passing from the harvesting head passes through the second frame and second opening and then through the first frame and the first opening, and further wherein the second frame can pivot with respect to the first frame;
a third frame that is generally rectangular and vertically extending, wherein a vertical side member of the third frame is hinged to a vertical side member of the second frame to define a first generally vertical pivot axis, and further wherein the third frame comprises at least one gauge wheel that is supported for rotation on the third frame; and
a fourth frame that is generally rectangular and vertically extending, wherein a vertical side member of the fourth frame is hinged to a vertical side member of the second frame, to define a second generally vertical pivot axis and further wherein the fourth frame comprises at least one gauge wheel that is supported for rotation on the fourth frame.

2. The agricultural combine of claim 1, further comprising a first arm having an outer end coupled to a lower, outer portion of the third frame to pivot up and down at its outer end with respect to the third frame, and on which outer end of said first arm the at least one gauge wheel is supported to pivot up and down, and to rotate with respect to said first arm.

3. The agricultural combine of claim 2, further comprising a second arm having an outer end coupled to a lower, outer portion of the fourth frame, to pivot up and down at its outer end with respect to the fourth frame and on which outer end of said second arm the at least one gauge wheel is supported to pivot up and down, and to rotate with respect to said second arm.

4. The agricultural combine of claim 1, wherein the second frame, the third frame, and the fourth frame, are parallel to each other in an operational position.

5. The agricultural combine of claim 4, wherein the second frame comprises an upper surface that faces up and that is configured to support an upper beam of the harvesting head.

6. The agricultural combine of claim 5, wherein the third frame, and the fourth frame comprise an upper surface that faces up and that is configured to support an upper beam of the harvesting head.

7. The agricultural combine of claim 5, wherein the second frame comprises a wall that extends upward from the upper surface and is disposed to abut the upper beam.

8. The agricultural combine of claim 1 further comprising the harvesting head removably mounted to the gauge wheel arrangement, wherein the gauge wheel arrangement remains as an assembled unit independent of the harvesting head upon removal of the harvesting head from the gauge wheel arrangement.

9. The agricultural combine of claim 1, wherein the second opening extends in a first plane and wherein the third frame and the fourth frame are pivotable about the first generally vertical pivot axis and the second generally vertical pivot axis, respectively, towards one another to a position forming a first acute angle between the second frame and the third frame and a second acute angle between the second frame and the fourth frame.

10. The agricultural combine of claim 1, wherein the combine has a longitudinal centerline and wherein the third frame has a transverse outer end that is pivotable about the first generally vertical pivot axis to a position directly in front of the feeder house.

11. A gauge wheel arrangement for an agricultural combine, wherein the agricultural combine has a chassis, a cleaning and separating system, a feeder house extending forward from the front of combine and configured to convey cut crop material to the cleaning and separating system, and further wherein the feeder house has a first frame that is generally rectangular and extends vertically and transversely, wherein the first frame defines an opening for receiving cut crop material from a harvesting head and for conveying it to the cleaning and separating system, and further wherein the first frame is configured to support a harvesting head on the front of the feeder house, the gauge wheel arrangement comprising:
a second frame that is configured to be pivotally supported on the first frame, wherein the second frame has a second opening that is generally rectangular and vertically extending, and further wherein the second frame is configured to support the first frame, and is aligned with the first frame, such that substantially all cut crop material passing from the harvesting head passes through the second frame and second opening and then through the first frame and the first opening, and further wherein the second frame can pivot with respect to the first frame;
a third frame that is generally rectangular and vertically extending, wherein a vertical side member of the third frame is hinged to a vertical side member of the second frame to define a generally vertical pivot axis, and further wherein the third frame comprises at least one gauge wheel that is supported for rotation on the third frame; and
a fourth frame that is generally rectangular and vertically extending, wherein a vertical side member of the fourth frame is hinged to a vertical side member of the second frame, to define a generally vertical pivot axis and further wherein the fourth frame comprises at least one gauge wheel that is supported for rotation on the fourth frame.

12. The gauge wheel arrangement of claim 11, further comprising a first arm having an outer end coupled to a lower, outer portion of the third frame to pivot up and down at its outer end with respect to the third frame, and on which outer end of said first arm the at least one gauge wheel is supported to pivot up and down, and to rotate with respect to said first arm.

13. The gauge wheel arrangement of claim 12, further comprising a second arm having an outer end coupled to a lower, outer portion of the fourth frame, to pivot up and down at its outer end with respect to the fourth frame and on which outer end of said second arm the at least one gauge wheel is supported to pivot up and down, and to rotate with respect to said second arm.

14. The gauge wheel arrangement of claim 11, wherein the second frame, the third frame, and the fourth frame, are parallel to each other in an operational position.

15. The gauge wheel arrangement of claim 14, wherein the second frame comprises an upper surface that faces up and that is configured to support an upper beam of the harvesting head.

16. The gauge wheel arrangement of claim 15, wherein the third frame, and the fourth frame comprise an upper surface that faces up and that is configured to support an upper beam of the harvesting head.

17. The gauge wheel arrangement of claim 16, wherein the second frame comprises a wall that extends upward from the upper surface and is disposed to abut the upper beam.

18. The gauge wheel arrangement of claim 11, wherein gauge wheel arrangement is configured to be removably mounted to the harvesting head such that the gauge wheel arrangement remains as an assembled unit independent of the harvesting head.

19. The gauge wheel arrangement of claim 11, wherein the second opening extends in a first plane and wherein the third frame and the fourth frame are pivotable about the first generally vertical pivot axis and the second generally vertical pivot axis, respectively, towards one another to a position forming a first acute angle between the second frame and the third frame and a second acute angle between the second frame and the fourth frame.

20. The gauge wheel arrangement of claim 11, wherein the combine has a longitudinal centerline and wherein the third frame has a transverse outer end that is pivotable about the first generally vertical pivot axis so as to be positionable directly in front of the feeder house.

* * * * *